United States Patent Office 3,152,728
Patented Oct. 13, 1964

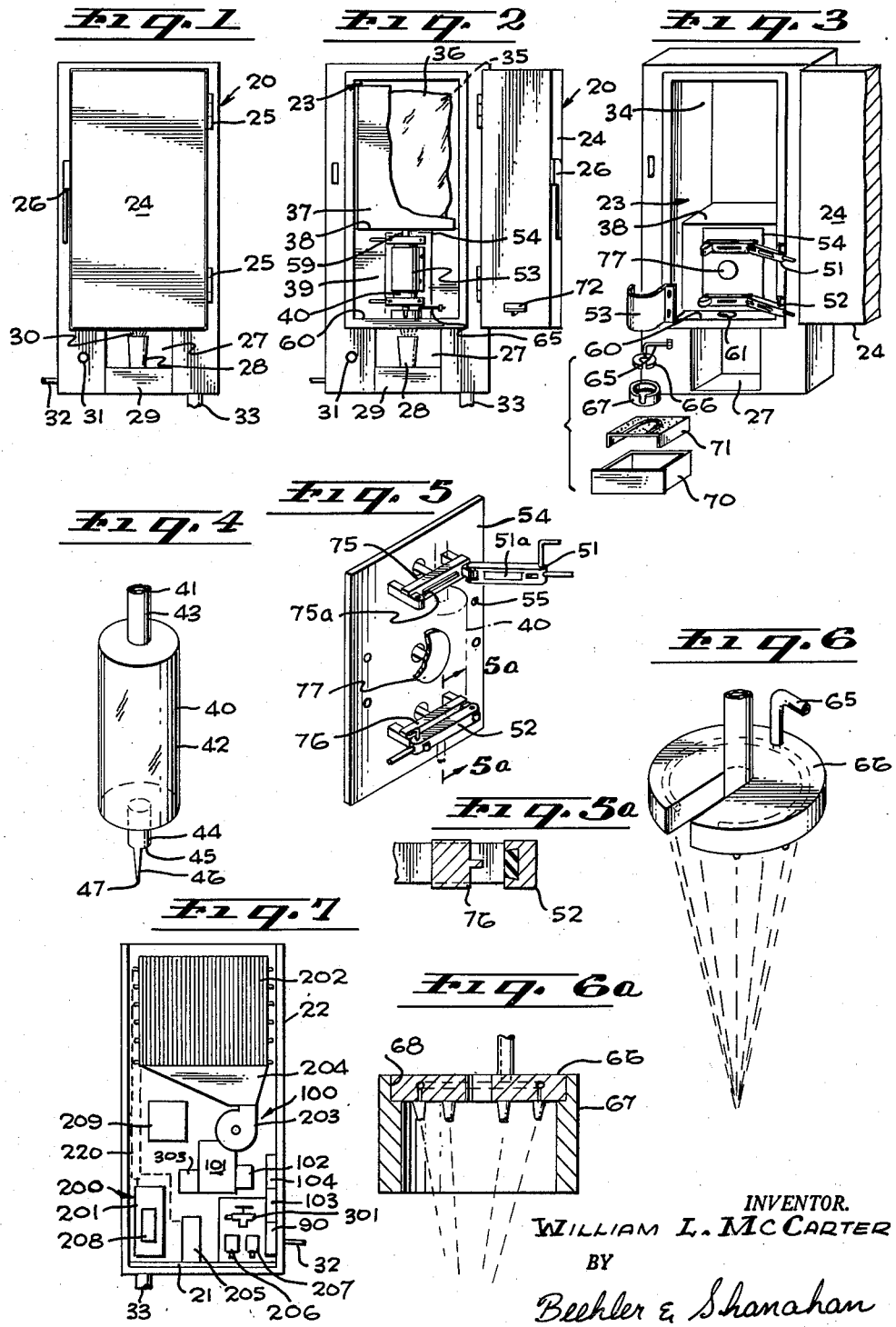

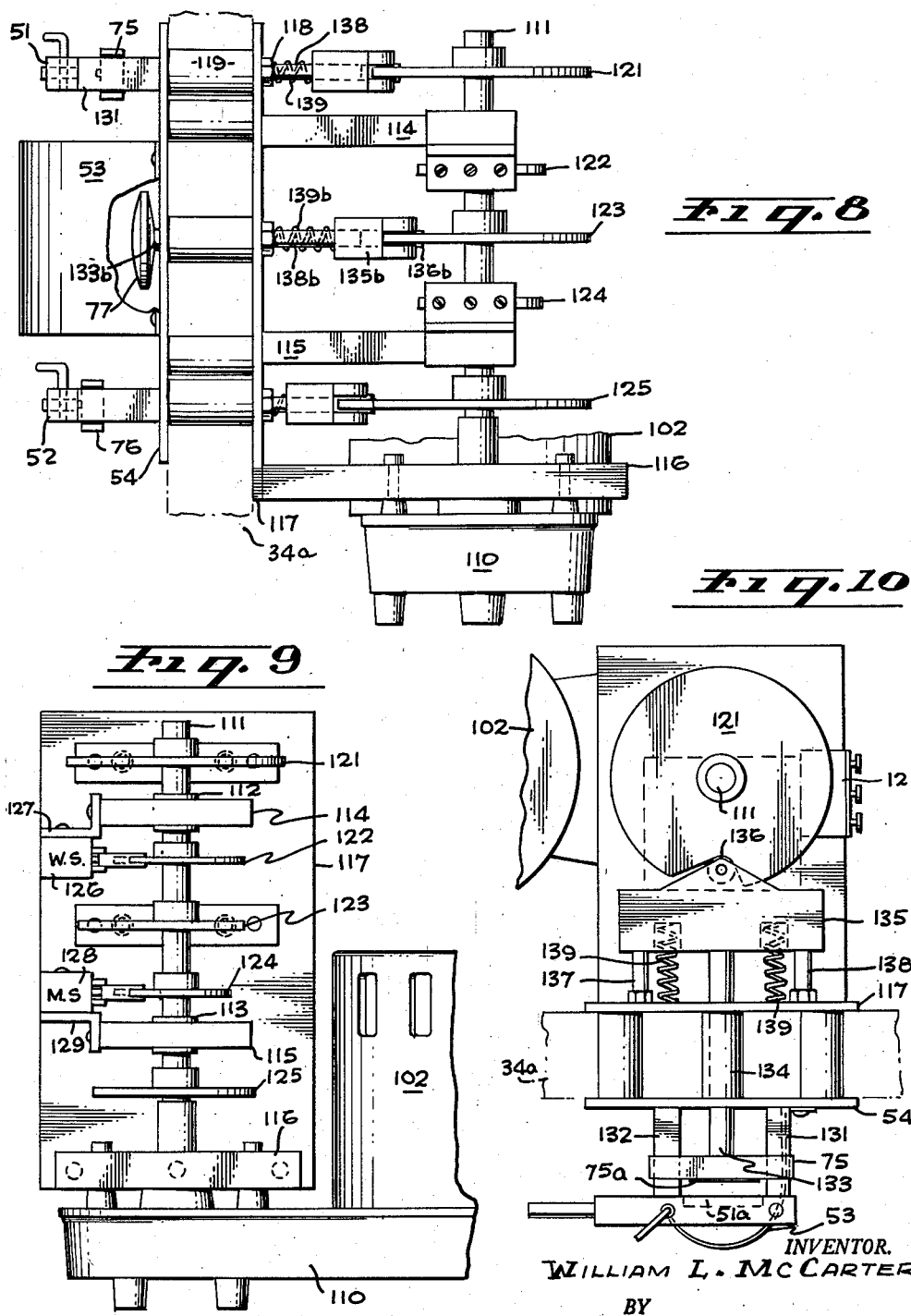

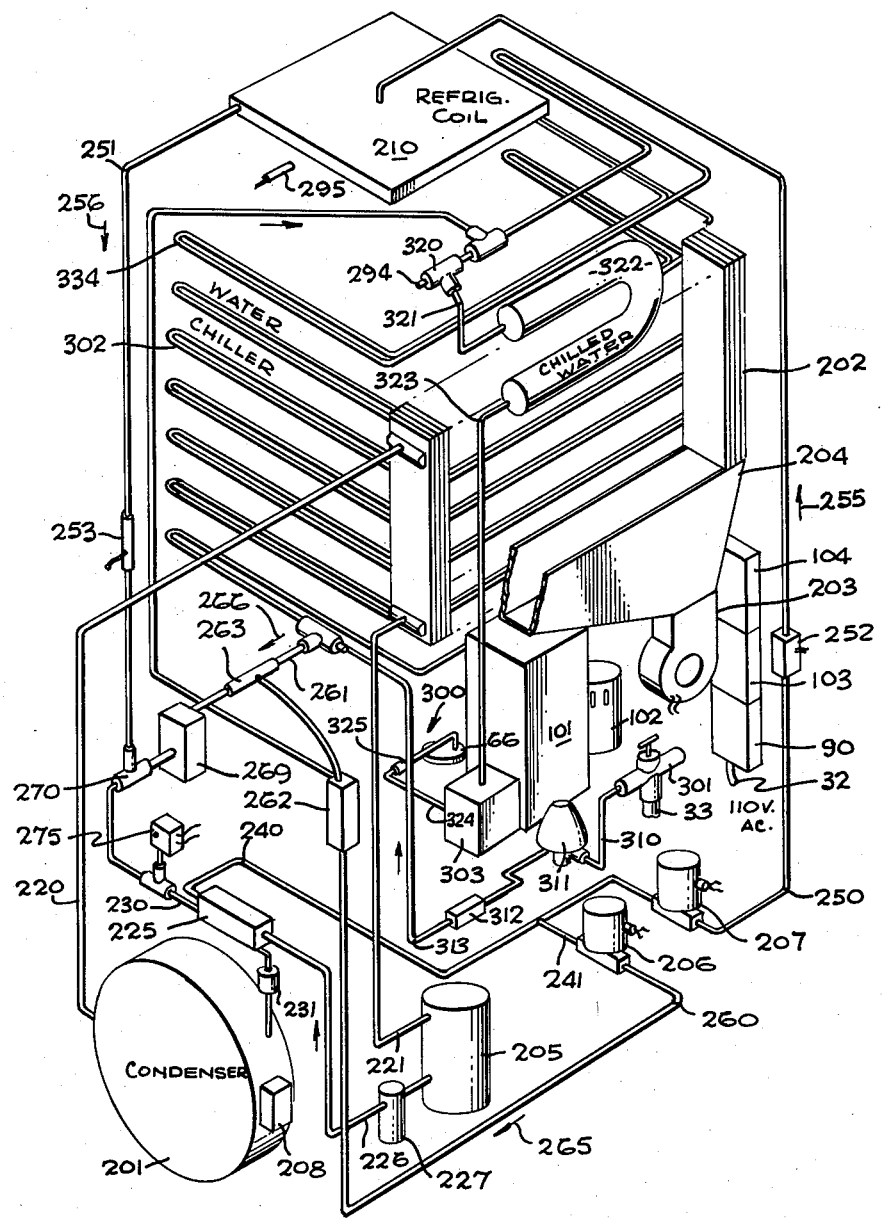

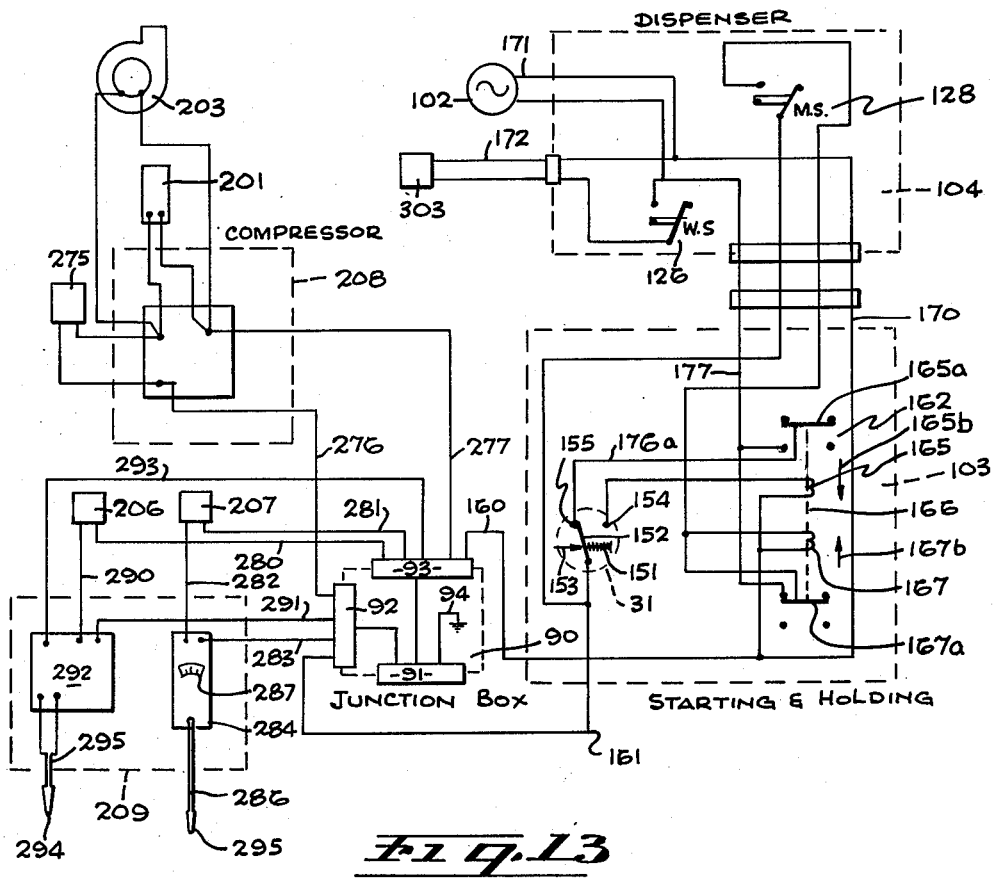

3,152,728
DRINK DISPENSER WITH METERING SYRINGE
AND RECONSTITUTING NOZZLES
William L. McCarter, Portland, Oreg., assignor to International Dispensing Co., Portland, Oreg., a corporation of Oregon
Filed Oct. 1, 1962, Ser. No. 227,510
15 Claims. (Cl. 222—129.4)

This invention relates generally to drink dispensers which are capable of serving a cup of beverage at a delivery output point by reconstituting the beverage from a liquid concentrate and a liquid diluent delivered in precisely measured amounts each time the delivery cycle is initiated by pushing a button or inserting a coin. More particularly, the invention relates to such a drink dispenser in which the beverage is reconstituted by the mingling of jets of concentrate and diluent in or near the cup, the concentrate being metered directly into the jet by means of a collapsible and disposable metering syringe.

The rapid expansion of in-plant food and beverage service by means of vending machines has created a demand for a drink dispenser, adapted to be automatically coin operated, and capable of delivering a palatable reconstituted beverage. The use of such reconstituting dispensers has been made feasible by great advancements in forming liquid or liquid-like food concentrates by partial dehydration. For example, a substantial part of the water content of fresh milk can be removed to reduce bulk and facilitate delivery and storage at point of service under refrigeration; the milk which is reconstituted a few hours later by thorough mixing of precisely metered portions of concentrate and water is indistinguishable from fresh whole milk. Fresh orange juice, partially concentrated by dehydration, produces a reconstituted orange juice indistinguishable from fresh orange juice, and far superior to ordinary frozen orange juice.

Reconstituted milk and orange juice make use of a liquid concentrate which is added to chilled water in a refrigerated vending machine or other dispenser. However, the invention does not depend for its novelty or whether the diluent is water or some other liquid; also, the concentrate need only be liquid-like, but may actually be a jelly or a flowable powder, or the like. In the preferred form of the invention, a refrigerated machine is used to store the concentrate in a chilled condition, and to deliver and mix portions of concentrate and chilled water each time the machine goes through a delivery cycle; however, it will be obvious that hot drinks could be served by the same novel metering syringe in cooperation with the same novel reconstituting nozzles, both concentrate and water being heated instead of chilled just prior to reconstitution of the beverage.

It has proven extremely difficult to design a drink dispensing machine capable of meeting sanitation requirements of governmental boards assigned to protect public health. Residual traces of concentrate are sometimes overlooked in cleaning the conduit system of the dispensing machine, with a result that they spoil and contaminate freshly added food concentrate. The boiling hot water and strong soaps and effective cleaning tools needed for thorough cleansing of food machinery are generally not available at vending machine or dispensing machine locations; indeed, their nonavailability is one of the compelling reasons for resorting to dispensing machines at the location. Service personnel are burdened with tedious machine cleaning tasks daily. If a machine is changed over from dispensing one kind of drink to another, for example, from orange juice to milk, microscopic traces of the drink for the prior concentrate may impart an unpalatable taste and odor to drinks reconstituted from the new constitute after changeover.

Sanitation has been rendered difficult by the growth of mold and bacteria introduced into the reservoirs, conduits, and valves of dispensing machines by air, which enters the system in small quantities each time a drink is drawn at the delivery point.

In order that all food-contacting parts of the dispenser be readily accessible for cleaning and inspection every few hours, and at least daily, they must be quickly accessible from the front of the machine. Good sanitation cannot be insured unless all parts exposed to food contact can be quickly and easily removed and cleaned or replaced with clean parts. Health inspectors often wisely require that the machine be designed so that all food-contacting parts can be uncovered and quickly removed from the front of the machine for frequent unannounced inspections. Such a requirement is entirely impracticable since removal of parts for inspection requires shut down of the machine, disassembly of important elements, and very often, discard of any remaining concentrate and reloading with entirely new concentrate. Thus, whenever an inspection occurs, the machine must be withdrawn from service until the next visit by a servicing and loading employee.

No drink dispensing and reconstituting machine heretofore known has met the foregoing and other sanitation requirements to the satisfaction of most health authorities. This is particularly true of chilled drinks, such as milk and orange juice, which are more vulnerable to spoilage than a hot drink, such as coffee, which is reconstituted from boiling water and an easily preserved concentrated material, such as powdered coffee. Most orange and milk drinks are sold from vending machines in individual containers; indeed, reconstituting dispensing machines of the bulk type, with which this invention is concerned, are barred by law from localities under the authority of certain health authorities, because of the inability of any previously known machine to meet their stringent sanitation standards.

The device of the present invention meets and surpasses even the most stringent specifications imposed by health departments. No air whatever enters the reservoir, conduit system, and other food passage parts of the present dispenser. As drink portions are withdrawn, a collapsible plastic container shrinks, under external air pressure, to the volume of the remaining concentrate, while, at the same time, removement of the concentrate through the remaining parts of the system, including valving means, metering means, pumping means, etc., is accomplished without the admission of air.

All food-handling parts of the machine are fully exposed to view and quickly removable for detailed inspection and cleaning when the door on the front of the machine is opened. Opening of the inspection door exposes to view a smooth stainless steel lined refrigerator compartment. The entire concentrate system, from reservoir to dispensing nozzle is comprised of impervious plastic film; the entire system is used only once, and thrown away with the exhaustion of each batch of concentrate.

In the past, drink dispensing machines which have attempted to solve the cleaning problem by simplification of mechanism have generally produced a beverage so badly reconstituted that they have been unable to achieve consumer acceptance. The amount of concentrate introduced into each portion served must be exactly metered; too small a portion of concentrate will shortchange the customer with a weak drink; too large a portion of concentrate will not only be wasteful but will result in a drink with an unnaturally heavy taste.

In addition to the bad proportioning characteristic of most drink dispensing and reconstituting machines heretofore known, inadequate intermixing of concentrate and diluent has repelled customers by producing drinks of strange taste and appearance. It is desirable from the standpoint of freshness of each drink that reconstitution take place immediately at the time of service, and not before, and that the mixture between concentrated diluent be homogeneous and acceptable not only from the standpint of taste but also visually. Some customers do not understand the principle of reconstitution and tend to assume they are being served a watered-down drink if they see the process of reconstitution take place.

In the present invention, precise metering is achieved despite the disposable character of the metering means, since the latter is comprised of a cylindrical bulb of soft but elastic material, with upstream and downstream restrictions which function as valves and nozzles.

Complete and thorough mixing of concentrate and diluent are achieved just above the cup location, and just before the reconstituted liquid comes into the view of the customer, by directing several streams of diluent in a converging cone joining a stream of concentrate from the nozzle of the metering syringe.

When it was first proposed to solve the problems of a reconstituting drink dispensing machine by using an entirely disposable plastic system, the objection was advanced that such a machine would be impractical because thin walled plastics could not be made to meet a given set of dimensions precisely or at least with reasonably close tolerance. However, it will be seen from the following description one exemplary embodiment of the invention, that precise metering of concentrate is achieved in spite of normal and customary variation in the dimensions of the plastic syringe. The coacting machine parts are designed to accommodate any syringe falling within a substantial tolerance range. Precision of metering is achieved without the precision fabrication required in the plunger and cylinder type of syringe. The syringe nozzle is drawn out to a capillary tube, which prevents dripping after delivery of a metered portion, without requiring complex valving which would be expensive to fabricate and difficult to clean.

In addition to the foregoing objects and advantages, the subject invention, in its preferred forms, incorporates many additional advantages over the prior art. For example, previous dispensing machines used for dispensing a chilled reconstituted drink have usually employed a reservoir for chilling the water or other diluent, thus making the machine relatively heavy and bulky. The present invention employs a continuous flow water cooling coil of novel construction, in which the refrigerant follows a spiral path around a coaxial water conduit. Regardless of how rapidly successive dispensing cycles occur, an adequate amount of completely chilled water is delivered by the water nozzles at the point of reconstitution of the beverage.

Also in the interest of conserving size and weight, by maximum refrigeration efficiency with a refrigeration unit of minimum size, the refrigerating coils are distributed through walls on several sides of the refrigerated compartment.

With these and other objects in view, the invention consists in the construction, arrangement and combination of the permanent and disposable parts of the dispensing and reconstituting machine, whereby the objects contemplated are attained, and the foregoing and other advantages are achieved, as disclosed by the following description of one specific embodiment, which in addition to the invention in its broadest sense, incorporates many special features, which may or may not be employed, depending upon the purposes of the user.

The description will make reference to the accompanying drawings, in which:

FIG. 1 is a front elevational view of a dispensing machine constructed according to my invention, with a cup shown receiving a stream of reconstituted beverage;

FIG. 2 is also a front elevational view, but with the front door of the refrigeration compartment opened to reveal the interior of the refrigerated compartment, the entire concentrate storage and dispensing system being revealed therein;

FIG. 3 is a front elevational view corresponding to FIG. 2 but with the entire plastic concentrate dispensing system removed, and the various metal parts removed or opened for cleaning;

FIG. 3a shows the removable metal parts grouped together in perspective views;

FIG. 4 is a front perspective view of a metering syringe and nozzle, shown separate and apart from its operating position in the dispensing machine of the invention;

FIG. 5 is a detail perspective view of those parts of the metering mechanism visible in the refrigeration compartment, and showing the plastic metering syringe in the process of undergoing a squeezing action for the ejection of one portion of concentrate from the concentrate nozzle;

FIGS. 6 and 6a are front and plan elevations, respectively, of the reconstituting nozzles, showing, particularly, the manifold and nozzles for delivering a conical arrangement of water jets to the descending stream of concentrate;

FIG. 7 is a rear view of the machine embodying the invention, showing a few parts visible from the rear in a typical construction;

FIGS. 8, 9 and 10 illustrate a preferred form of cam and plunger mechanism for operating the dispenser system, FIG. 8 being a right side elevational view of the mechanism as seen forward and to the rear of the rear wall of the refrigerated compartment;

FIG. 9 is a rear elevational view of the cam and plunger system of FIGURE 8; and FIGURE 10 is a plan view of the mechanism of FIGURES 8 and 9;

FIG. 11 is a schematic drawing of the refrigeration system of the device, shown in perspective, and partially broken away, to reveal the flow of fluid through the refrigeration cycle;

FIG. 12 is a detail illustration of the construction of the concentric tubing employed for chilling the water;

FIG. 13 is a wiring diagram of the electrical circuitry employed in the invention.

In FIGURE 1, a dispensing device constructed according to the invention is indicated generally by the numeral 20. An angle-iron frame 21 (not visible in the front view of FIGURE 1, but seen, in part, in the rear view of FIGURE 7) supports an enclosing stainless steel housing 22. The upper front of the machine contains a refrigeration compartment 23, seen in FIGURE 2, which is ordinarily closed by front door 24, which is mounted on hinges 25 and provided with a locked latch 26. Keys to the locking latch 26 would be available to the servicing attendant and the health inspector.

A drink delivery recess 27 is seen in the lower front of the dispensing machine 20. A cup 28 is supported upon a movable drip tray assembly 29. A stream of beverage 30 is seen being ejected into the cup 28.

A cycling button 31 in the front of housing 22 controls an electric switch which, after one drink delivery cycle has been completed, can be used to initiate another drink delivery cycle.

It will be obvious that any of the conventional coin machine mechanisms for coin-controlled initiation of the drink delivery cycle may be used instead of push button 31.

The dispensing machine 20 requires no connections other than the plugging of 110 volt electric supply line 32 to a standard duplex outlet, and the connection of water supply line 33 to the public water supply, assuming the latter to be the usual potable water.

FIGURES 2, 3 and 3a reveal the simplicity and speed with which inspection and cleaning of the dispensing machine 20 may be accomplished. When the front door 24 is unlocked and swung open, as seen in FIGURE 2, the refrigeration compartment 23 is seen to have a deeply recessed storage portion 34, within which is stored a supply of concentrate 35, contained within a collapsible plastic bag 36, which is in turn enclosed within a protective cardboard carton 37, the latter being fragmentarily broken away for purposes of this illustration. It will be understood, that the plastic bag 36 collapses step by step as each portion of concentrate 35 is withdrawn from it by successive operations of the drink dispensing machine, without the introduction of any air into the bag 36. Also, upon exhaustion of the concentrate 35, neither bag 36 nor cardboard carton 37 are reused; both are destroyed, and a fresh supply of concentrate in a brand new bag and carton are placed within the storage compartment 34.

Carton 37 is supported on a shelf 38, which is formed by the stainless steel interior walls of the refrigeration compartment 23 by virtue of the fact that the back wall is stepped forward in the lower portion of the refrigeration compartment 23 to provide a relatively shallow syringe section 39.

A thin-walled plastic metering syringe 40 is seen coupled, at its upper or aspiration end 41, directly to the outlet 59 of the concentrate storage bag 36.

The perspective view of the syringe 40, FIGURE 4, shows that it has a central bulb 42 in the form of a vertical cylinder, with upstream and downstream conduits 43 and 44, respectively, of reduced cross section. Downstream conduit 44 has a step reduction 45 in its diameter to a capillary tube 46 extending downward to concentrate nozzle 47.

In FIGURE 2, the plastic metering syringe 40 is partially concealed by upper and lower clamping means 51 and 52, and bulb support bracket 53, which support its operating position within the metering syringe section 39 of refrigerator compartment 23, which are, in turn, supported on a front panel 54. Front panel 54 is bolted to the rear wall of the refrigeration compartment 23.

Clamps 51 and 52 are hinged at the right side to swing open as illustrated in FIGURE 3, and bulb support bracket 53 is simply lifted out of its retaining boltheads 55 (see FIGURE 5) for purposes of cleaning.

FIGURES 2 and 3 show that the floor 60 of the refrigeration compartment 23 is provided with a vertical hole 61 through which concentrate and water are projected in streams which mix as they descend into the cup 28 as illustrated in FIGURE 1.

Chilled water is supplied through water line 65, to water manifold 66, seen in FIGURE 3a, for which it is downwardly projected a plurality of jets forming an inverted cone about the descending stream of concentrate, as illustrated in FIGURES 6 and 6a. A splash collar 67 encircles the nozzle above the hole 61, but is preferably notched as at 68 for ready viewing of the nozzle, and is readily removable for washing.

Any spillage is collected in a drip tray 70, which receives a nesting cupped tray 71 of perforated metal.

A nozzle aligning bracket 72, on the inside surface of the front door 24 holds the downstream conduit 44 of the metering syringe 40 in vertical alignment, when the front door 24 is closed.

FIGURE 3 shows the ease with which the various parts of the machine, including the interior wall surfaces of the refrigerator compartment 23, may be cleaned when the plastic storage bag 36 and metering syringe 40 are removed. The removable parts are illustrated in FIGURE 3a.

Concentrate 35 from the bag 36 is delivered in a precisely metered portion from the metering syringe 40 by three cam-operated plunger means illustrated in FIGURES 8, 9, and 10, to be described hereinafter. But, before proceeding to the description of the plunger mechanism, a description of the cycle of operation, as viewed from in front of front panel 54 will assist in understanding the construction and operation of the dispensing machine 20.

The drink delivery cycle may be described with reference to FIGURE 5. It will be understood that the upstream and downstream conduits 43 and 44, being made of flexible and elastic plastic, can function as upstream and downstream shut-off valves when their walls are pinched together. This pinching is accomplished at desired stages of the operation of the device by means of pinch bars 75 and 76, which are reciprocable by a dispenser mechanism to be described in detail hereinafter in connection with FIGURES 8 to 10. Also, the bulb 42 can be emptied by a bulb squeezer plate 77, which is also reciprocable in proper sequence by the aforementioned dispenser mechanism. These reciprocable devices, together with a water valve control means and a dispenser mechanism motor control means, all to be described hereinafter in connection with FIGURES 11 and 13, function to produce the following:

*Drink Delivery Cycle*

(1) Coin or push button actuation to initiate the drink delivery cycle.

(2) The pinch bar 76 retracts from the downstream conduit 44 to accomplish downstream valve opening.

(3) A water valve within housing 22 opens and delivers jets of water through water manifold 66.

(4) Bulb squeezer plate 77 advances and compresses syringe bulb 42, thereby ejecting a stream of liquid concentrate downwardly through concentrate nozzle 47.

(5) The water valve shuts off, the drink service having now been completed.

(6) The downstream pinch bar 76 advances against downstream conduit 44, producing downstream valve closure.

(7) The refilling of syringe 40 now begins with the retraction of upstream pinch bar 75 from upstream conduit 43, producing the function of upstream valve opening.

(8) The bulb squeezer plate 77 now retracts from the bulb 42, which, because of its elasticity, resumes its natural shape, thereby aspirating a new metered portion of liquid concentrate into syringe 40 from collapsible concentrate reservoir 36.

(9) The upstream pinch bar 75 next advances against upstream conduit 43 to accomplish closure of the upstream valve.

(10) The dispenser mechanism shuts off the dispenser motor in a starting position ready for the next occasion upon which the drink delivery cycle is initiated.

Daily cleaning, refilling, and servicing of the dispenser 20 can be accomplished entirely from the front. Almost all major servicing and repairing can be carried out at the back of the machine without extensive disassembly. FIGURE 7 shows a simplified rear view. The major internal components of the dispenser 20 are grouped in a dispenser system indicated generally by the numeral 100, a refrigeration system indicated generally by the numeral 200, and a water chilling system indicated generally by the numeral 300, not visible in FIGURE 7, since it is concealed within the walls of the refrigeration compartment 34, but seen in the schematic view of FIGURE 11, which shows the water chilling system as it would appear if the walls, insulation, and structure of frame 21, housing 22, could be made to disappear.

Electric power is supplied to the entire device through the incoming powerline 32, which is preferably a three wire line, two wires for single phase 110 volt alternating current, and one ground wire. This is connected into a junction box 90, which may also incorporate any fuses required, in compliance with standard electrical codes.

FIGURE 7 reveals that the principle components of the dispenser system 100 are clearly visible and readily accessible at the rear of the machine. These are the dispenser mechanism 101, the dispenser motor 102, the dispenser electrical circuitry 104, and the dispenser starting and holding circuit 103.

Similarly, the principle components of the refrigeration system 200 are also visible and accessible. The compressor 201 is preferably a standard purchased type of electric motor and compressor in a permanently lubricated system mounted inside a sealed housing. The air cooled condenser 202 is hung on the back of the housing 22, freely exposed to air circulation, and is cooled by means of a fan 203 delivering air through air funnel 204. The liquid refrigerant reservoir 205 is readily accessible for purposes of repair. The principal refrigeration valves 206 and 207, for the water chiller and the refrigeration of the refrigerator compartment 34, respectively, are visible at the rear of the machine.

Circuitry and instrumentation for the refrigeration system 200 are conveniently accessible and compressor and fan control circuit 208 and temperature control circuit 209. Of course, the refrigeration system 200, also comprises an extensive circulating system, not visible in FIGURE 7, but illustrated in FIGURE 11, which function to provide proper operation of a regfrigeration coil 210 and a spiral coolant flow water chiller 211.

The water chilling system 300 is also illustrated primarily in FIGURE 11. Water is admitted to the system through a water supply valve 301, from which it passes through a water chiller 302, being delivered to the cup 28 carrying the drink delivery cycle by a water metering valve 303, as will be described in detail hereinafter.

*Dispenser Mechanism 101*

In dispenser mechanism 101, illustrated in detail in FIGURES 8 to 10, the motor 102, energized during the drink cycle through circuit 103 and 104, drives a reduction gear 110, which in turn rotates a vertical cam shaft 111 at relatively slow speed. Cam shaft 111 is rotatably mounted in bearings 112 and 113, which are mounted in bearing supports 114 and 115. The motor 102 and gear box 110 may be conveniently carried on a motor and gear box support 116, bearing supports 114 and 115 as well as motor support 116 being shelf-like projections integral with a back mounting plate 117, which is clamped to the rear exterior of the refrigerator compartment wall 34a, seen fragmentarily in section in FIGURE 8, by means of bolts 118, which pass through nylon bushings 119 to front plate 54.

Vertical cam shaft 111 carries five cams, reading from top to bottom as follows:

Cam Description:                  Identifying numeral

Upstream shut-off cam for controlling the reciprocation of pinch bar 75 _____ 121
Water cam for metering a single portion of water during the drink delivery cycle _____ 122
Bulb squeeze cam for controlling the reciprocation of the bulb squeezer plate 77 _____ 123
Motor cam for shutting off the motor 102 upon the completion of the drink delivery cycle ____ 124
Downstream shut-off cam for controlling the reciprocation of downstream pinch bar 76 _____ 125

It will be seen that three of the cams, cams 121, 123, and 125 are employed to produce reciprocation of the reciprocating elements 75, 77, and 76, whereas the water cam 122 and the motor cam 124 merely operate electrical switches, a water solenoid switch 126, mounted from bearing support 114 by bracket 127, and motor switch 128 mounted from bearing support 115 by bracket 129. Further description of the functions of switches 126 and 128 will be given in connection with the description of the electric diagrams of FIGURE 13.

The reciprocation of upper and lower pinch bars 75 and 76 is accomplished by means which are identical except as to timing, and may be clearly seen from the plan view of FIGURE 10. Pinch bar 75 is seen to be carried on guides 131 and 132, being reciprocated by a plunger 133 reciprocable in a bushing 134 extending through the insulated wall 34a.

Plunger 133 is connected at the rear to a yoke 135 which carries a cam follower roller 136 in contact with the associated upstream shut-off cam 121.

The yoke 135 is guided in its reciprocating path by yoke guides 137 and 138, but is resiliently urged in toward the cam 121 by resilient springs 139, which springs serve to retract the upper pinch bar 75 except when their force is overcome by the contour of cam 121.

It should be noted that unique means are provided to insure positive shut-off of upper conduit 43, regardless of variations in its diameter. The inner surface of the hinged retaining bar 51 is provided with a rubber cushion 51a, and the mating face of the pinch bar 75 is provided with a projecting metal ridge 75a, so that upstream conduit 43 can be pinched to closure, without injury, regardless of a substantial range of size variation.

The lower pinch bar 76 is operated in response to the contour of downstream shut-off cam 125 by a mechanism exactly duplicating that already described in connection with upper pinch bar 75.

The bulb squeezing plate 77 squeezes the bulb 42 against the bulb retaining member 53 in response to the contour of bulb squeezer cam 123 by means of yoke 135b, a cam follower roller 136b, yoke guides such as 138b, retraction springs 139b, and a plunger 133b, but does not require any guide shafts corresponding to 131 and 132.

It will be understood that the invention is not restricted to the exact sequence of steps described in a previous paragraph on the drink dispensing cycle, and that the duration of each step may vary for different materials or conditions of operation, and further, that steps may not be exactly successive but may overlap to some degree. Experimentation will determine the best mode of operation. The cams will vary in contour and will be designed in accordance with standard engineering principles to produce the mode of operation desired. The novelty of the present invention does not reside in the particular shapes of the cams.

*Starting and Holding Circuit 103*

In FIGURE 13, the starting and holding circuit is indicated generally within the dashed outline 103.

Starting button 31 is held in the normal off position illustrated in FIGURE 13 by means of a spring 151, until the push button or coin diverts the switch contact 152 in the direction of the arrow 153 to the starting contact 154. Only momentary contact at 154 is required, after which, the switch connection 152 may snap back to rest position on rest terminal 155.

It will be appreciated that voltage is being applied to the starting and holding circuit 103 at all times regardless of whether button 31 is in contact with starting terminal 154 or rest terminal 155. As previously mentioned in connection with FIGURES 1 and 7, electric power is supplied through line 32 and enters the dispenser 20 at the junction box 90, being connected to a power terminal strip 91, with three leads to black wire terminal strip 92, white wire terminal strip 93, and ground connection 94. Power for starting and holding circuit 103 is delivered by way of lines 160 and 161.

When push button 31 is pushed to connect switch member 152 momentarily to starting terminal 154, a holding relay 162, which may be of standard type, is energized. Holding relay 162 has a starting coil 165, a switching member 166, and a stopping coil 167. The switching member 166 carries two pairs of moving contacts, 165a and 167a, one pair at each end.

Upon starting by button 31, switching member 166 is shifted from the rest position illustrated to a cycle position (lower position in the wiring diagram of FIG. 13) in the direction of the arrow 165b by coil 165 and remains in the cycle position for almost the entire cycle (one cycle being one complete rotation of cam shaft 111) but a few degrees before the end of the cycle, the motor cam 124, which normally holds motor switch 128 in open position permits the motor switch to close for the brief remaining portion of the cycle. During this brief period of closure, motor switch 128 energizes stopping coil 167 thereby lifting the relay switch member 166 back to the rest position in the direction of arrow 167b as illustrated in FIGURE 13. When switching member 166 is raised to the rest position, motor 102 continues to receive electric power through contacts 167a of relay 162 and motor switch 128 for the brief remaining portion of the cycle, until the motor cam 124 reopens the motor switch 128, thus terminating the cycle by de-energizing the motor circuit.

*Dispenser Circuit 104*

It will be seen from FIGURE 13 that all items are permanently connected to the white wire 160, including the water valve 303 which is solenoid operated, the dispenser motor 102, and both the coils 165 and 167 of the holding relay 162. White wire connections to the motor 102 and the valve 303 are by way of line 170 and lines 171 and 172.

It is through the black wire side of the circuits that the switching control is carried out. Black wire connection to both motor 102 and valve 303 comes by way of lines 176a and 177, through contacts 165a of holding relay 162 as already explained in connection with the starting and holding circuit 103.

Solenoid valve 303 is energized through water switch 126 during most of the operating cycle, as will be explained hereinafter.

*Water Metering Switch 126*

On the start of the rotation of the water cam 122, water switch 126 is closed by cam rotation, energizing and opening water metering solenoid valve 303. Near the end of the cycle (one rotation of the cam shaft 111) the water switch 126 is opened by water cam 122, and the water metering solenoid valve 303 is closed upon being de-energized.

*Refrigeration System 200*

In FIGURE 11, the fan control circuit 208 and temperature control circuit 209 have been removed in order to better illustrate the physical disposition on the parts of the dispenser 20, their detailed description being left for description of the circuitry in connection with FIGURE 13. Hot compressed refrigerating gas flows from the compressor 201 to the air cooled condenser 202 by way of pipe 220, and having been cooled and liquified therein, is transferred to the liquid refrigerant reservoir or receiver 205 by way of line 221. Liquid refrigerant flows from the reservoir 205 to a heat exchanger 225 by way of pipe line 226 and a service valve 227, conveniently located at the rear of dispenser 20.

In heat exchange 225, the liquid refrigerant is flowed in a countercurrent heat exchange relationship with cold refrigerant gas returning by way of line 230 and line tap valve 231 to the compressor, for recompression.

The high pressure sub-cooled liquid passes from the heat exchanger 225 by way of line 240 and 241 to water chiller valve 206 and refrigerant coil valve 207, respectively. Refrigerant solenoid valves 206 and 207 are energized and controlled by independent temperature controls 294 and 295 for the water chiller and cabinet, respectively.

Liquid refrigerant from valve 207 is circulated through the refrigeration coil 210 by way of a delivery line 250 and a return line 251 as indicated by arrows 255 and 256. During this circulation, the refrigerant is expanded in thermal expansion valve 252, from which saturated gas passes through line 255 to refrigerating coils 210, thence as a superheated gas through return line 251 to compressor suction by way of T 270. Delivery rate of refrigerant through thermal expansion valve 252 is controlled by sensing element 253 on return gas line 251.

Similarly, liquid refrigerant from valve 206 is circulated through the water chiller 300 by way of a delivery line 260 and a return line 261, as indicated by arrows 265 and 266, expansion taking place in thermal expansion valve 262 controlled by sensing element 263. The gas passes through an evaporator pressure regulating valve 269, which limits suction pressure, and therefore temperature, in the water chiller evaporator coil 302, in order to prevent freezing of water in chiller 300.

The two return lines 251 and 261 join at pipe T 270 and return to the compressor by way of line 230, heat exchanger 225, and valve 231 as already described.

A pressure-sensing low-pressure cut-out switch 275 is provided in return line 230, in order to start and stop the compressor 201 to maintain suction pressure (and hence temperature) within a predetermined range.

The temperature control circuit 209, illustrated in FIGURE 13, is also of a standard type and may be of any suitable construction which accomplishes the same function. Refrigerant valves 206 and 207 are solenoid operated, and are connected to the white wire terminal strip 93 of the junction box 90 by lines 280 and 281, respectively. The black wire side of refrigeration compartment valve 207 is connected to the black wire terminal strip 92 by way of lines 282 and 283 in series with a temperature responsive relay 284, which continuously detects the temperature within the refrigeration compartment 34 by means of a sensing element 285 connected to relay 284 by a capillary tube 286. A thermometer scale 287 on the relay 284 may be read from the rear of the dispenser 20.

The water chiller refrigerant valve 206 is connected to the black wire terminal strip 92 by way of lines 290 and 291 in series with an electronic temperature control relay 292, which receives its operating power through common black wire line 291 and a separate white wire line 293. The solenoid of water chiller refrigerant valve 206 is operated in response to the temperature of the chilled water as detected by a thermistor sensing element 294, which is located in the water chiller 302, and is connected to the electronic temperature control relay 292 by way of electric lines 295.

*Water Chilling System 300*

Water piped to the dispenser 20 by the water supply pipe 33 enters the water chilling system 300 through water supply valve 301 (which is merely a standard hand-operated valve which is normally never closed except when the dispenser 20 is to be disconnected from the water supply) and flows by way of a line 310, a pressure regulator 311, an adjustable needle valve 312, and line 313 to the water chiller 302, which is a counterflow heat exchanger of novel construction, described below.

Chilled water leaves the water chiller 302 at T 320, and passes by way of line 321 to a small chilled water reservoir 322. Whenever the solenoid operated water metering valve 303 is opened during the dispensing cycle, as already described, chilled water passes from the chilled water reservoir 322 through line 323, valve 303, line 324, and coupling 325 to the water manifold 66, from which it pours into the water cup 28, being simultaneously mixed with a stream of concentrate 35, as already described.

The thermistor sensing element 294 may be conveniently located in T 320, for detection of water temperature and operation of water chiller refrigerant control valve 206.

Water chiller 302 is constructed, as illustrated in the detail view of FIGURE 12, with a water tube 330 surrounded by a substantially coaxial refrigerant tube 331 of sufficiently large diameter to provide an annular space 332 for the flow of refrigerant. A copper wire 333 is spirally wound on water tube 330, and fits snugly against the interior walls of refrigerant tube 331 so as to produce a spiral flow of the cold refrigerant gas around the water tube 330. The spiral flow achieves better refrigeration. Also, it makes possible the bending of the coaxial assembly of inner water tube 330 and outer refrigerant tube 331 in loops 334 which circulate the water and counterflowing refrigerant within the walls of the refrigeration compartment 34, simultaneously accomplishing two objects very advantagous in the construction and operation of dispenser 20. In the first place, the arrangement of the water chiller 302 around the refrigeration compartment 34 tends to establish an optimum temperature for both water and concentrate within compartment 34 with a minimum of operation of refrigeration system 200. In the second place, the water chiller 302 provides a means for chilling and, to some degree, storing chilled water within the dispensing machine 20 without requiring the bulky tanks of stored chilled water which, in chilled drink dispensers previously known, have required the construction of relatively large machines of ackward shape.

Conclusion

The foregoing description of the drawings has disclosed one preferred specific embodiment of the invention, but is not to be construed as requiring limitations not incorporated in the claims.

The invention broadly comprehends a drink dispensing machine in which the entire food-handling system is disposible, and is replaced anew with each loading of the food material, thus making possible extremely high standards of sanitation.

Moreover, the food handling system is inserted into the machine as a single unit, complete from reservoir to nozzle. Although the plastic metering syringe 40 may be fabricated and shipped separately from the concentrate bag 36, it will be found to be convenient and practical to permanently couple a metering syringe 40 to the discharge opening of a full concentrate bag 36, for transport to the dispenser 20 inside of carton 37. Carton 37 may have thick insulating walls to protect the chilled concentrate 35 from warming during brief periods of transport. Unlike previously proposed food-handling systems, with replaceable parts, which have generally used several separate components requiring manual assembly, the plastic parts of the present invention are handled by service personnel only from the exterior.

The moving parts, including the upstream and downstream valve mechanisms, and the bulb squeezer, carry out their functions effectively, but without ever coming in contact with the food material except through the flexible plastic walls of the metering syringe 40. Moreover, the entire food-handling system is enclosed in a refrigerated compartment 34, while the motor 102, which would produce a certain amount of heat, and the dispensing mechanism 101, which must necessarily have a number of surfaces and recesses in which dirt could remain undetected, are entirely separated from the food-handling parts by the refrigeration compartment wall 34a and snug nylon bushings 119.

It will be appreciated that the preferred embodiment illustrated incorporates a great many features which constitute species of the general invention, which may be preferred in particular instances, and that many departures and changes may be made in the construction shown, within the scope of the invention, as defined in the following claims.

Having thus described the invention, what is claimed as new in support of Letters Patent is:

1. A machine for automatically dispensing a metered portion of liquid at a delivery location, which machine includes:

a housing having an internal partition separating its interior into a liquid-dispensing compartment and a mechanism compartment;

a container for liquid, which container is constructed of a thin-walled flexible material readily collapsible under the pressure of atmospheric air as said liquid is exhausted from its interior;

a metering syringe located in said liquid-dispensing compartment, and comprising an upstream conduit portion connected to said container, a downstream conduit portion discharging a portion of said liquid, and an intermediate metering bulb portion of substantially larger cross section than said conduit portion, said syringe being resiliently flexible, and capable, after squeezing, of resuming its predefined shape, to aspirate liquid from said collapsible container;

valve plunger means reciprocable in said partition, and adapted to selectively pinch to closure said upstream conduit and said downstream conduit;

bulb squeezer plunger means reciprocable in said partition for squeezing said bulb;

and dispensing cycle control means comprising a dispensing mechanism within said mechanism compartment, for operating said plungers in a sequence and for a duration to achieve delivery of a metered portion of said liquid from said downstream conduit.

2. A machine for automatically dispensing a metered portion of liquid at a delivery location, which machine includes:

a housing having an internal partition separating its interior into a liquid-dispensing compartment and a mechanism compartment;

a container for liquid which container is constructed of a thin-walled flexible material readily collapsible under the pressure of atmospheric air as said liquid is exhausted from its interior;

a metering syringe located in said liquid-dispensing compartment, and comprising an upstream conduit portion connected to said container, a downstream conduit portion for discharging a portion of said liquid, and an intermediate metering bulb portion, said syringe being resiliently flexible, and capable, after squeezing, of resuming its predefined shape, to aspirate liquid from said collapsible container;

valve plunger means reciprocable in said partition, and adapted to selectively pinch to closure said upstream conduit and said downstream conduit;

bulb squeezer plunger means reciprocable in said partition for squeezing said bulb;

dispensing mechanism in said mechanism compartment comprising a cam shaft and cams for operating said plunger means in a sequence of aspiration from said container and discharge from said syringe with intervening co-operative closures and openings of said conduits;

and sealing bushing means in said partition around said plungers for establishing substantially liquid-tight sanitary insulation between said liquid-dispensing compartment and said mechanism compartment.

3. A machine for automatically dispensing a metered portion of liquid at a delivery location, which machine includes:

a housing which includes a liquid-storage compartment, a dispensing mechanism compartment, a vertical separating wall between said compartments, and a drink delivery location below said liquid storage compartment;

a container for liquid, said container being located in said liquid storage compartment and constructed of a thin-walled flexible material readily collapsible under the pressure of atmospheric air as said liquid is exhausted from its interior;

a metering syringe vertically disposed in said liquid-storage compartment adjacent said separating wall, below said container, and having an upstream conduit connected to said container, an intermediate metering bulb portion of enlarged cross section, and a downstream conduit terminating in a nozzle discharging to said drink delivery location, said syringe being constructed resuming its predefined shape to aspirate concentrate from said container;

a pair of valve plunger means reciprocable in said separating wall, one for said upstream conduit, and one for said downstream conduit;

bulb squeezer plunger means horizontally reciprocable in said separating wall for squeezing said bulb;

sealing bushing means in said partition around said plungers for establishing substantially liquid-tight sealing between said liquid-storage compartment and said dispensing mechanism compartment;

and a dispensing mechanism mounted in said dispensing mechanism compartment near the rear of said separating wall, and including a vertically disposed cam shaft, motor means for driving said cam shaft and cam means on said cam shaft operating said plungers, in a sequence and for a duration to achieve delivery of a metered portion of liquid at said delivery location.

4. A machine for automatically dispensing a metered portion of liquid at a delivery location, which machine includes:

a housing which includes a refrigerator compartment, a dispensing mechanism compartment, a vertical insulative separating wall between said compartments, and a drink delivery location below said refrigerator compartment;

a refrigeration system for cooling said refrigerator compartment;

a container for liquid, said container being located in said refrigerator compartment and constructed of a thin-walled flexible material readily collapsible under the pressure of atmospheric air as said liquid is exhausted from its interior;

a metering syringe vertically disposed in said refrigerator compartment adjacent said separating wall, below said container, and having an upstream conduit connected to said container, an intermediate metering bulb portion of enlarged cross section, and a downstream conduit terminating in a nozzle discharging to said drink delivery location, said syringe being constructed of resiliently flexible material capable, after squeezing, of resuming its predefined shape to aspirate concentrate from said container;

a pair of valve plunger means reciprocable in said separating wall, one for said upstream conduit, and one for said downstream conduit;

bulb squeezer plunger means horizontally reciprocable in said separating wall for squeezing said bulb;

sealing bushing means in said partition around said plungers for establishing substantially liquid-tight and heat-insulating sealing between said refrigerator compartment and said dispensing mechanism compartment;

dispensing mechanism mounted in said dispensing mechanism compartment near the rear of said separating wall, and including a vertically disposed cam shaft, motor means for driving said cam shaft and cam means on said cam shaft operating said plungers, in a sequence and for a duration to achieve delivery of a metered portion of liquid at said delivery location;

and cycle control means associated with said cam shaft for controlling said motor means to terminate a dispensing cycle.

5. A machine for automatically reconstituting a liquid from a concentrate and a diluent, and dispensing a metered portion of reconstituted liquid at a delivery location, which machine includes: a container for concentrate which is constructed of a thin-walled flexible material readily collapsible under the pressure of atmospheric air as said concentrate is exhausted from its interior; a metering syringe comprising an upstream conduit portion connected to said container, a downstream conduit portion discharging at said delivery location, and an intermediate metering bulb portion, said syringe being constructed of a resiliently flexible material capable, after squeezing, of resuming its predefined shape to aspirate concentrate from said container; syringe squeezing means for selectively squeezing said upstream conduit portion, said downstream conduit portion, and said bulb portion; dispensing cycle control means for operating said selective syringe squeezing means in a sequence of aspiration from said container and discharge from said metering bulb with intervening cooperative closures and openings of said conduits; diluent delivery means for commingling diluent with concentrate near the discharge from said downstream conduit; and valve means controlled by said dispensing cycle control means for metering diluent to said diluent delivery means during said dispensing cycle.

6. A machine for automatically reconstituting a liquid from a concentrate and a diluent, and dispensing a metered portion of chilled reconstituted liquid at a delivery location, which machine includes: a housing which includes a refrigerator compartment; a container for concentrate in the upper part of said refrigerator compartment which is constructed of a thin-walled flexible material readily collapsible under the pressure of atmospheric air as said concentrate is exhausted from its interior; a metering syringe located in the lower part of said refrigerator compartment and comprising an upstream conduit portion connected to said container, a downstream conduit portion discharging at said delivery location through an opening in said housing, and an intermediate metering bulb portion, said syringe being constructed of a resiliently flexible material capable, after squeezing, of resuming its pre-defined shape to aspirate concentrate from said container; syringe squeezing means for selectively squeezing said upstream conduit portion, said downstream conduit portion and said bulb portion; diluent delivery means for commingling diluent with concentrate near the discharge from said downstream conduit; valve means for metering diluent to said diluent delivery means during said dispensing cycle; electrically driven cam means exterior to said refrigeration compartment for operating said syringe squeezing means and said valve means in a sequence of aspiration from said container, discharge from said metering bulb with intervening cooperative closures and openings of said conduits and said valve means; and switch means for operation by said cam means to terminate the operation of said cam means upon the completion of a portion delivery cycle.

7. A machine for automatically reconstituting a liquid from a concentrate and a diluent, and dispensing a metered portion of chilled reconstituted liquid at a delivery location, which machine includes: a housing which includes a refrigerator compartment; a container for concentrate in the upper part of said refrigerator compartment which is constructed of a thin-walled flexible material readily collapsible under the pressure of atmospheric air as said concentrate is exhausted from its interior; a metering syringe located in the lower part of said refrigerator compartment and comprising an upstream conduit portion connected to said container, a downstream conduit portion discharging at said delivery location through an opening in said housing, and an intermediate metering bulb portion, said syringe being constructed of a resiliently flexible material capable, after squeezing, of resuming its pre-defined shape to aspirate concentrate from said container; syringe squeezing means for selectively squeezing said upstream conduit portion, said downstream conduit portion and said bulb portion; a plurality of plunger means for operating said syringe squeezing means, said plunger means being reciprocable in the walls of said housing from the exterior of said refrigerator compartment; diluent delivery means for commingling diluent with concentrate near the discharge from said downstream conduit; valve means for metering diluent to said diluent delivery means during said dispensing cycle; electrically driven cam means exterior to said refrigerator compartment for operating said plunger means and said valve means in a sequence of aspiration from said container, and discharge from said metering bulb, with intervening cooperative closures and openings of said conduits and said valve means; and switch means operated by said cam means to terminate the operation of said cam means upon the completion of a portion delivery cycle.

8. A machine for automatically reconstituting a liquid from a concentrate and a diluent, and dispensing a metered portion of chilled reconstituted liquid at a delivery location, which machine includes: a housing which includes a refrigerator compartment; a container for concentrate in the upper part of said refrigerator compartment which is constructed of a thin-walled flexible material readily collapsible under the pressure of atmospheric air as said concentrate is exhausted from its interior; a metering syringe located in the lower part of said refrigerator compartment and comprising an upstream conduit portion connected to said container, a downstream conduit portion discharging at said delivery location, and an intermediate metering bulb portion of substantially larger cross section than said conduit portions, said syringe being constructed of a resiliently flexible material capable, after squeezing, of resuming its pre-defined shape to aspirate liquid for said collapsible container; resiliently cushioned means for pinching said upstream and said downstream conduits to closure; bulb squeezing means for displacement of liquid from said metering bulb portion of said syringe by compression from the interior of said springe; a plurality of plunger means for operating said conduit pinching means and said squeezing means, said plunger means being reciprocable in the walls of said housing from the exterior of said refrigerator compartment; diluent delivery means for commingling diluent with concentrate near the discharge from said downstream conduit; valve means for metering diluent to said diluent delivery means during said dispensing cycle; electrically driven cam means exterior to said refrigeration compartment for operating said plunger means and said valve means in a sequence of aspiration from said container, discharge from said metering bulb with intervening cooperative closures and openings of said conduits and said valve means; and switch means for operation by said cam means to terminate the operation of said cam means upon the completion of a portion delivery cycle.

9. A machine for automatically reconstituting a chilled beverage from water and liquid concentrate, and dispensing metered portions of said beverage, which machine includes: a housing which includes a refrigerator compartment, a dispensing mechanism compartment to the rear of said housing, an insulated separating wall between said compartments, and a drink delivery location in the front of said housing below said refrigerator compartment; a water chiller; a refrigeration system for cooling and circulating cold refrigeration fluid to refrigerate said refrigeration compartment and chill said water chiller; a concentrate container in the upper part of said refrigeration compartment, said container being constructed of a thin-walled flexible material readily collapsible under the pressure of atmospheric air as concentrate is exhausted from its interior; a metering syringe comprising an upstream conduit portion connected to said container, a downstream conduit portion discharging at said delivery location, and an intermediate metering bulb portion of substantially larger cross section than said conduit portions, said syringe being constructed of a resiliently flexible material capable, after squeezing, of resuming its pre-defined shape to aspirate liquid from said collapsible container; valve plunger means reciprocable in said separating wall and adapted to selectively pinch to closure said upper conduit and said lower conduits; bulb squeezer plunger means reciprocable in said rear wall for squeezing said bulb; water metering valve means for delivering a metered portion of water from said water chiller to said drink delivery location; electrically operated drink delivery cycle control means for said drink delivery cycle comprising a dispensing mechanism mounted in said dispensing mechanism mounted in said dispensing mechanism compartment on the rear of said separating wall for operating said plungers and said valve in a sequence and for a duration to achieve delivery of a metered portion of concentrate and water at the drink delivery location; and drink cycle starting means for delivering starting power to said drink delivery cycle control means.

10. A machine for automatically reconstituting a chilled beverage from water and liquid concentrate, and dispensing metered portions of said beverage, which machine includes: a housing which includes a refrigerator compartment, a dispensing mechanism compartment to the rear of said housing, an insulated separating wall between said compartments, and a drink delivery location in the front of said housing below said refrigerator compartment; a water chiller; a refrigeration system for cooling and circulating cold refrigeration fluid to refrigerate said refrigeration compartment and chill said water chiller; a concentrate container in the upper part of said refrigeration compartment, said container being constructed of a thin-walled flexible material readily collapsible under the pressure of atmospheric air as concentrate is exhausted from its interior; a metering syringe comprising an upstream conduit portion connected to said container, a downstream conduit portion discharging at said delivery location, and an intermediate metering bulb portion of substantially larger cross section than said conduit portions, said syringe being constructed of a resiliently flexible material capable, after squeezing, of resuming its pre-defined shape to aspirate liquid from said collapsible container; valve plunger means reciprocable in said separating wall and adapted to selectively pinch to closure said upper conduit and said lower conduits; bulb squeezer plunger means reciprocable in said rear wall for squeezing said bulb; water metering valve means for delivering a metered portion of water from said water chiller to said drink delivery location; drink delivery cycle control means for said drink delivery cycle comprising a dispensing mechanism mounted in said dispensing mechanism compartment on the rear of said separating wall, and including a vertically disposed cam shaft, motor means for driving said cam shaft, and cam means on said cam shaft operating said plungers in a sequence and for a duration to achieve delivery of a metered portion of concentrate and water at the drink delivery location; and drink cycle starting means for delivering starting power to said motor and initiating the rotation of said cam shaft.

11. A machine for automatically reconstituting a chilled beverage from water and liquid concentrate, and dispensing metered portions of said beverage, which machine includes: a housing which includes a refrigerator compartment, a front access door for said refrigerator compartment, a dispensing mechanism compartment to the rear of said housing, an insulated separating wall between said compartments, and a drink delivery location in the front of said housing below said refrigerator compartment; a refrigeration system for cooling and circulating cold refrigeration fluid; a refrigerating coil for refrigerating said refrigeration compartment; a refrigeration compartment valve and temperature sensing means controlling said valve for circulating a temperature regulated flow of said refrigeration fluid through said refrigeration coil; a water chiller comprised of a water tube and a refrigerant tube in heat exchange relationship with each other, said water chiller being disposed in the walls of said refrigeration compartment; a water chiller refrigerant valve and water temperature sensing means controlling said valve for producing a temperature circulation of said refrigerant fluid through said water chiller; a concentrate container in the upper part of said refrigeration compartment, said container being constructed of a thin-walled flexible material readily collapsible under the pressure of atmospheric air as concentrate is exhausted from its interior; a metering syringe in the form of a vertically disposed cylinder, and having an upstream conduit and a downstream conduit and an intermediate metering bulb portion of enlarged cross section, said syringe being disposed in the lower part of said refrigeration compartment adjacent said separating wall, with said upstream conduit connected to said collapsible concentrate container and said downstream conduit terminating in a nozzle discharging to said drink delivery location, said syringe being constructed of a resiliently flexible material capable, after squeezing, of resuming its pre-defined shape to aspirate concentrate from said container; valve plunger means reciprocable in said separating wall and adapted to selectively pinch to closure said upper conduit and said lower conduit; bulb squeezer plunger means reciprocable in said rear wall for squeezing said bulb; water metering valve means for delivering a metered portion of water from said water chiller to said drink delivery location; drink delivery cycle control means for said drink delivery cycle, comprising a dispensing mechanism mounted in said dispensing mechanism compartment on the rear of said separating wall, and including a vertically disposed cam shaft, motor means for driving said cam shaft, and cam means on said cam shaft operating said plungers, in a sequence and for a duration to achieve delivery of a meter portion of concentrate and water at said drink delivery location; and drink cycle starting means for delivering starting power to said motor and initiating the rotation of said cam shaft.

12. A drink reconstituting and dispensing machine as described in claim 11, in which said water tube is enclosed within said refrigerant tube and a spiral baffle is wound on said water tube in the annular space between said tubes to produce spiral flow of refrigerant fluid circulated therethrough.

13. A drink dispensing and reconstituting machine as described in claim 11 in which said water valve delivers water to a manifold encircling said nozzle, and said manifold is a plurality of jets disposed around said nozzle and directed to produce a cone of water converging on a stream of concentrate descending from said nozzle.

14. A drink dispensing and reconstituting machine as described in claim 11 in which said pinching plungers compress said upper and lower conduits against retainer bars which are removable for cleaning from the front opening of said refrigerator compartment.

15. A drink reconstituting and dispensing machine as described in claim 11 in which said plungers carry yokes bearing rollers in contact with said cams, said yokes being guided towards said cams by guide means projecting rearwardly from said refrigerator wall and urged toward said cam by resilient spring means.

References Cited in the file of this patent

UNITED STATES PATENTS

| | | |
|---|---|---|
| 920,250 | Blakeslee | May 4, 1909 |
| 1,392,601 | Rose | Oct. 4, 1921 |
| 2,689,530 | Harvey | Sept. 21, 1954 |
| 2,905,560 | Bender et al. | Sept. 22, 1959 |
| 2,907,495 | Brous | Oct. 6, 1959 |